United States Patent [19]

Million

[11] 3,848,360
[45] Nov. 19, 1974

[54] MEANS FOR AND METHOD OF POTTING PLANTS

[76] Inventor: Charles J. Million, 2426 Millegar Ln., Vista, Calif. 92083

[22] Filed: Mar. 2, 1973

[21] Appl. No.: 337,676

[52] U.S. Cl. ............................. 47/58, 47/1, 53/24, 141/12, 141/67
[51] Int. Cl. ............................................. A01g 9/08
[58] Field of Search ............ 47/1, 58; 53/24, 112 R, 53/124 B; 141/12, 67, 71, 73

[56] References Cited
UNITED STATES PATENTS

| | | | |
|---|---|---|---|
| 2,721,684 | 10/1955 | Heinl et al. | 47/1 X |
| 2,955,396 | 10/1960 | Preis | 53/124 B |
| 3,157,389 | 11/1964 | Williams | 47/1 X |
| 3,195,283 | 7/1965 | Broersma | 53/24 X |
| 3,227,351 | 1/1966 | Vogt | 53/22 R X |
| 3,260,285 | 7/1966 | Vogt | 53/24 X |
| 3,263,395 | 8/1966 | Broersma | 53/24 X |
| 3,468,095 | 9/1969 | Vogt | 53/24 |
| 3,693,836 | 9/1972 | Eisner | 141/67 X |

FOREIGN PATENTS OR APPLICATIONS 683,717  12/1952  Great Britain ........................... 47/1

*Primary Examiner*—Robert E. Pulfrey
*Assistant Examiner*—Paul T. Sewell
*Attorney, Agent, or Firm*—Duane C. Bowen

[57] ABSTRACT

A vacuum is applied to the bottom of a pot to pull the roots of a plant downwardly into the pot and to pack growing medium around the roots. A potting table has interchangeable pot holders for different sized pots. The pot holders have a vacuum source connected during use and have solenoid-powered ejectors. Operator control discontinues vacuum and operates the ejector after each plant is potted.

14 Claims, 12 Drawing Figures

PATENTED NOV 19 1974 3,848,360

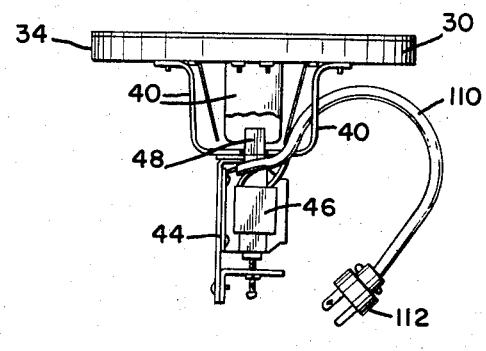
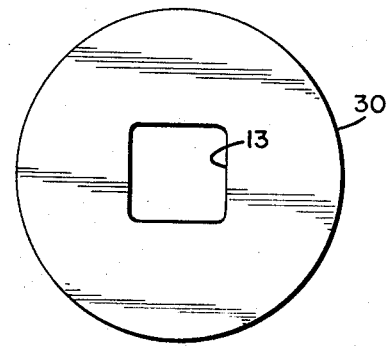
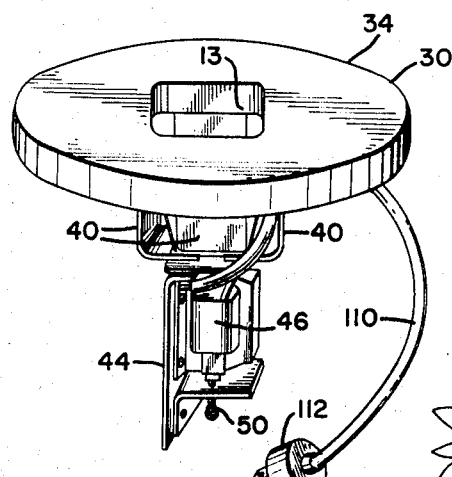
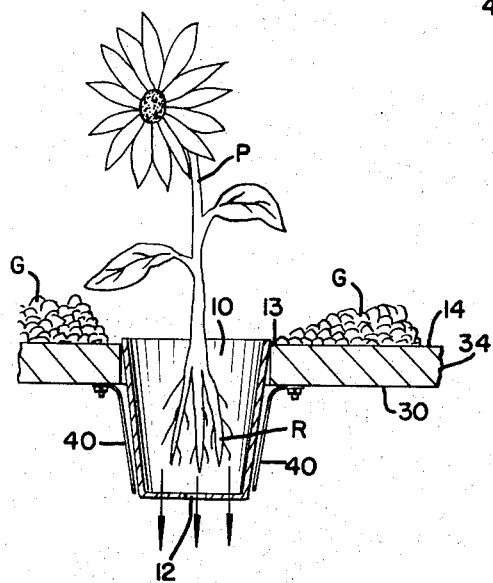
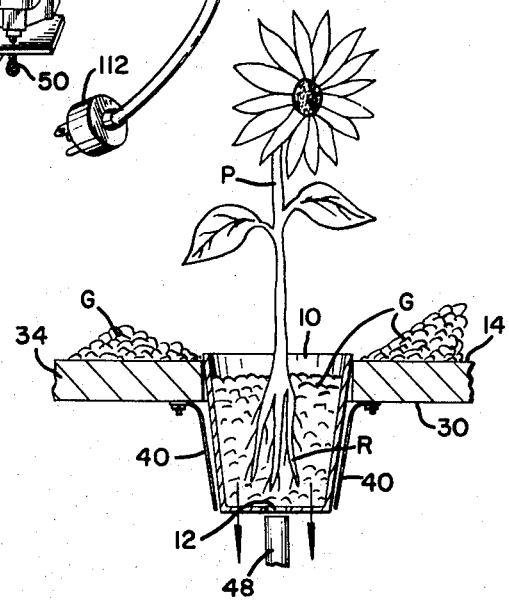

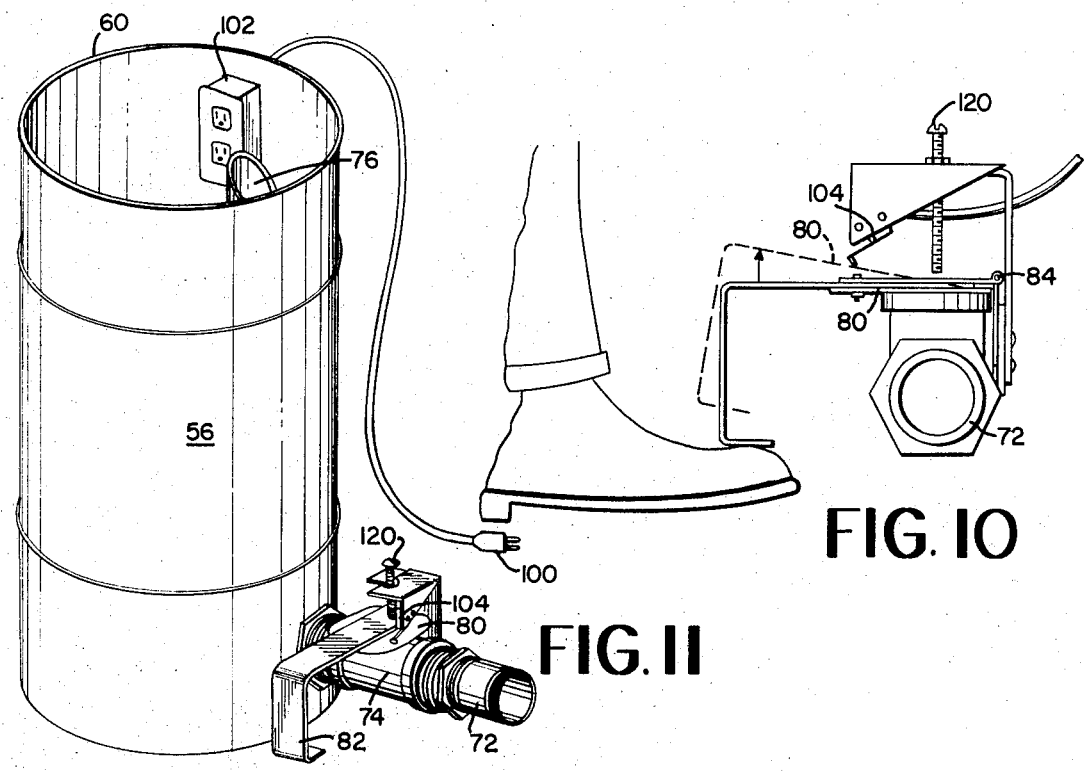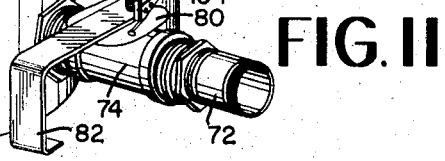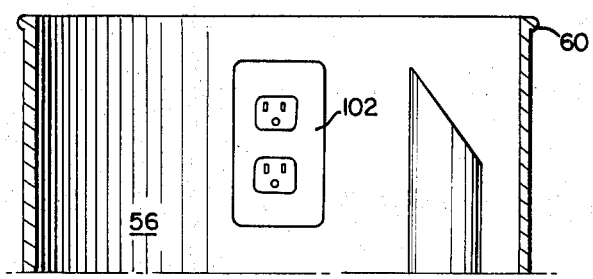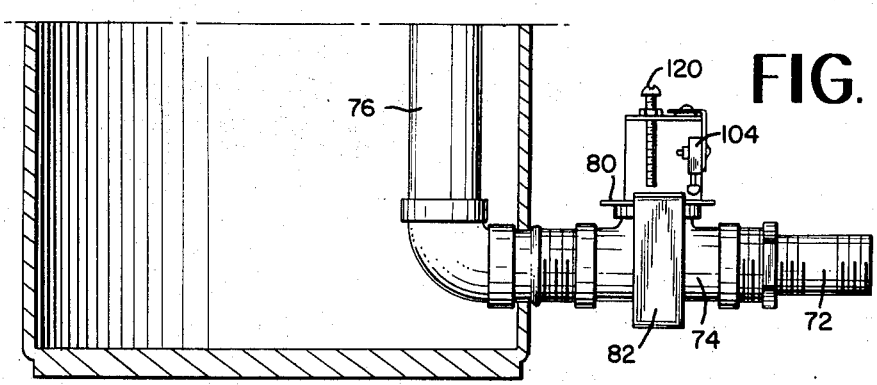

MEANS FOR AND METHOD OF POTTING PLANTS

BRIEF SUMMARY OF THE INVENTION

A means for and method of potting plants is provided utilizing vacuum to pull the roots of a plant into proper position in a pot and to pack growing medium around the roots.

In potting plants commercially, various facilities have been provided to achieve economy in potting plants but prior use of a vacuum in this connection is not known to me. One of the objectives of my invention is to use a vacuum source and to apply it to a pot through an opening in the pot bottom to achieve improved results and economy in potting plants.

The common way to pot a plant commercially is first to position the plant with its roots in a pot. To achieve reasonable production rates, this has to be done rapidly and commonly results in the plant roots being bent from the vertical and often even being partly bent upwardly. To an extent, in order to achieve economically feasible production rates, it can be said the plants are "slapped" into place. Certainly there is not time to carefully vertically orient the root structure. Roots are only productive when they grow downwardly. To the extent they are not so oriented during potting, the plant takes time to reorient root growth or may even die. It is an objective of my invention to provide vacuum pulling downwardly into a pot (pulling air downwardly into a pot) during potting to pull roots, including fine roots, of a plant into substantially vertical depending position before and during potting to orient the roots into substantially ideal position for growth.

Ideally, the growing medium is packed tightly about the roots of a plant during potting. To achieve suitable production rates commercially, in effect usually the growing medium is dropped into the pot and packed from the top, which results in better packing at the top of the platn than at the bottom. It will be understood that to achieve good packing of the roots is difficult, i.e., it is impractical commercially to put in a little growing medium, pack it, add a little more, pack it, etc. It is an objective of my invention to achieve packing about the roots by application of a vacuum through the bottom of the pot, so that it can be said the growing medium is packed from the bottom up.

Further objectives of my invention include: (a) to provide interchangeable means adapted to various sizes and shapes of pots; (b) to provide operator-controlled means when a plant is being potted to rapidly discontinue vacuum and to eject the pot from its holder; and (c) to provide other associated apparatus to facilitate economical production, to achieve low cost of the planting facility, and to provide ease of operation and low maintenance.

My invention will be best understood, together with additional objectives and advantages thereof, from the following description, read with reference to the drawings, in which:

FIG. 5 is a side view of an interchangeable potting head used in the apparatus.

FIG. 6 is a top view of the head shown in FIG. 5.

FIG. 7 is a perspective view of the head shown in FIG. 5.

FIG. 8 shows a plant having its roots drawn downwardly into a pot by the application of a vacuum. Portions of a potting head are also shown.

FIG. 9 is like FIG. 8 only showing dirt being packed around the plant roots by the vacuum.

FIG. 10 shows portions of the assembly controlled by the operator's foot to discontinue vacuum and to energize the pot ejector mechanism.

FIG. 11 is a perspective view primarily of portions of the drum and associated vacuum system.

FIG. 12 is an enlarged side view, partly in section, of the structure viewed in FIG. 11.

Figure 1:
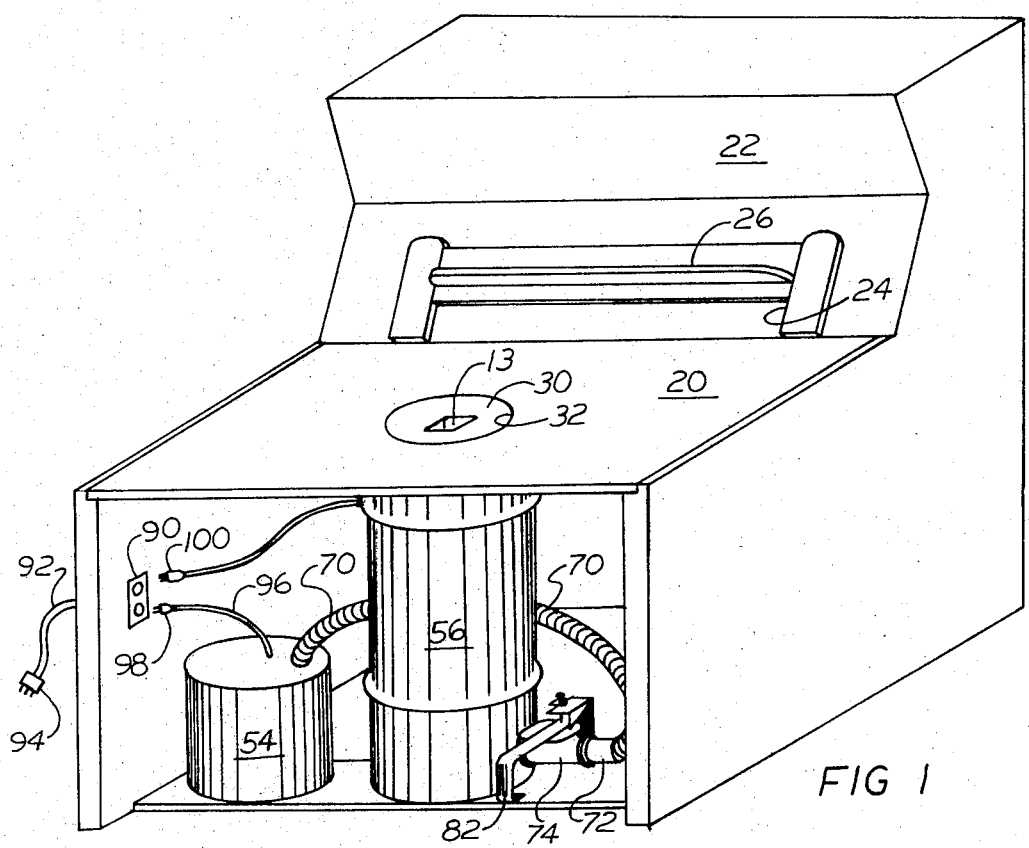
FIG. 1 is a view in perspective of a potting table showing an embodiment of my invention.

FIG. 8 shows a plant P positioned in a pot 10 and having its roots R drawn downwardly by a vacuum represented by arrows. This illustrates the results I achieve by applying a vacuum through the opening or openings 12 in the bottom of the pot. The roots R have ideal vertical orientation, in the direction of natural growth. The poor root disposition common in commercial packing, due to time limitations, have already been described.

FIG. 9 shows the packing of a growing medium G into pot 10. The growing medium G is brought across the work surface into the pot. As it falls in, the vacuum tends to pack it. It will be understood that the vacuum is most effective in packing at the bottom and starts from the time the first growing medium enters the pot 10, so that it can be said (as far as the vacuum is concerned, as distinguished from any manual packing) that the growing medium G is packed from the bottom up. This is an ideal situation as the roots R, that need the best packing, have the best packing, which is not usually achieved in commercial packing, due to the necessities of mass production, as has already been described.

Plants are usually initially grown in nursery flats, growing beds, rooting beds, etc. When they are potted (individually or in groups), this is usually into a plastic pot, occasionally into a terra cotta pot, with one or more openings in its bottom. My invention, obviously, is not restricted to the type of pot, as long as there is an access opening or openings (normally found in pots for drainage) to apply vacuum to the pot bottom. Pots come in various sizes and shapes, and, as later indicated, I provide interchangeable potting heads to accept different sizes and shapes of pots. It will be understood that my invention applies generally to the potting of various types of plants.

My invention, of course, applies to various types of growing mediums, such as peat moss, top soil, wood compost, sand, vermiculite, etc., used in pots to nurture plants. Plants can be planted by my method with practically zero plant loss, due to the proper orientation of roots, including hair roots, and because of the good packing around the roots. It is my impression that plant loss can run as high as 15 percent in prior commercial practices. Of course plant loss varies between hardy and non-hardy plants and I do not mean to give exact figures on plant losses, but my impression is that losses can be economically quite significant in prior commercial methods of packing, and they can be reduced to a minimum with my method. The method, as indicated, consists, essentially, of placing a pot in a recess 13 in a work surface 14, as depicted in FIGS. 7 and 8, applying a vacuum through the bottom of the pot, positioning the plant P in the pot and drawing its roots R downwardly by the vacuum, bringing the growing medium G across the work surface to fall into the pot 10, and packing the growing medium G about the plant roots R through means of the vacuum. It will be understood, at this point, that the pot 10 is being held down by the vacuum. My method further involves discontinuing the vacuum and popping the pot up above the working surface 14 by ejection by means of a vertically movable ejector arm 48, so that a minimum of time is involved in removing the potted plant and positioning the next pot 10 in the recess 13.

The above description describes the method of potting plants. I will now more completely describe the apparatus involved in my invention. The components are associated with a potting table 20 providing a basic work surface. The growing medium G is deposited in a hopper assembly 22 at the opposite side of the table from the side where the operator sits. A discharge opening 24 feeds the growing medium out on the surface of the table so that it can be raked by the operator into the pots in the planting operation. A sliding cover 26 is used to close opening 24 to prevent drying out of the growing medium when the table is not in use.

Interchangeable potting heads 30 are used with recesses 13 sized and shaped for different pots. Table 20 has a circular opening 32 to receive the potting heads which have circular planar upper portions 34. The potting heads 30 are held up in place, with the working surfaces 14 flush with the top of the table, by clips 36, which are preferably formed of wire to avoid build-up of growing medium to interfere with seating of potting heads 30.

Four metal plates 40 are shown as depending from upper portion 34 to support pots 10 in recess 13. They are joined together at their lower portions by a metal framework 44 that supports a solenoid 46 that powers an ejector plunger 48 in vertical movement from an inactive position immediately below pot 10 to an upper position when energized thereby forcing pot 10 up out of recess 13. Limit of downward movement of plunger 48 is adjusted by a threaded adjusting assembly 50 supported by framework 44 below plunger 48.

Figures 2, 3:
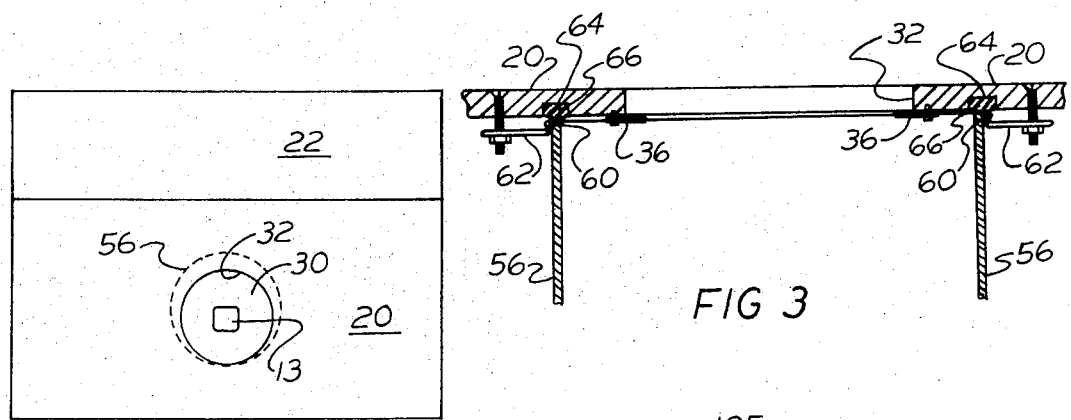
FIG. 2 is a plan view on reduced scale, of the table of FIG. 1.
FIG. 3 is an enlarged view, partly in section, of releasable means for holding a drum under the potting area.

Plates 40 are separated and are shaped to fit pot 10 so that room is provided for access of vacuum to the opening or openings 12 in the bottom of pot 10. The vacuum pump 54 (which may be selected from various electrically-powered vacuum pumps on the market) is not directly connected to the pot but instead acts through the medium of a drum or tank 56. The use of drum 56 serves several purposes. One purpose is to provide a vacuum capacity so that application of vacuum to pot 10 is not dependent directly on immediate action and capacity of pump 54, but rather pot 10 is subjected to the action of what may be called a reservoir or accumulator of vacuum, if the terms can be used to describe an absence of energy or content rather than the reverse. The rim 60 of drum is sealed against the lower side of table 20 by clips 62 that removably hold rim 60 in place and pressed aginst a resilient sealing strip 64 positioned in a circular groove 66 formed in the lower surface of the table. Note from FIG. 2 that drum 56 and potting head 30 are off-center so as to provde more operator room by having the center of the potting head closer to the operator than the center of the drum.

A flexible hose 70 connects to a pipe 72 attached to drum or barrel 56. Pipe 72 has an intervening valve 74 and connects interiorly of the drum to a nozzle 76 which has its upper end off-center of the drum and away from the location of recess 13. The nozzle positioning serves two purposes: (a) to be above accumulation of growing medium dropping through recess 13 and building up in drum 56 during potting, and (b) to avoid growing medium dropping into the nozzle and blocking up passages, pump, etc. Accumulated growing medium in drum 56 can be removed through opening 32 in table 20 when the potting head 30 is removed.

The purpose of valve 74 is to vent the vacuum at the time it is desired to remove a pot, so the pot won't be held down by the vacuum. The valve is a simple fitting with an upper venting opening closed by a flat pivotal valve piece 80. An arm 82 is operated by the operator's toe to raise valve piece 80 to pivot about hinge 84 to admit air to the system when it is desired to cease application of vacuum to recess 13.

Figure 4:
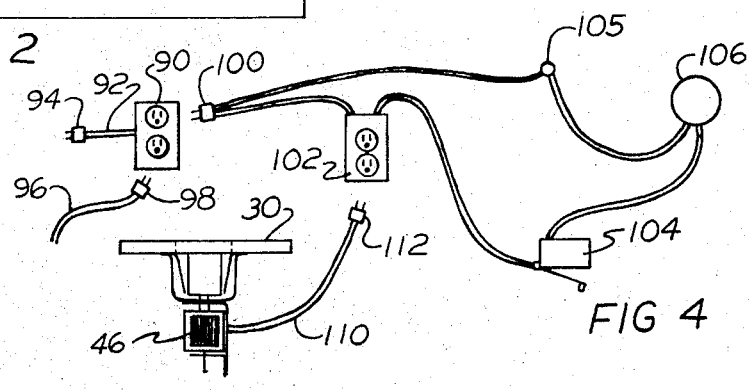
FIG. 4 is a diagrammatic view of electrical components of the apparatus.

The electrical system is depicted particularly in FIGS. 4 and 1 and includes the table outlet 90, a conduit 92 and a plug 94 for connecting to external power, a conduit 96 and a plug 98 for vacuum pump 54, and a plug 100 connecting to a circuit including an outlet 102 mounted on the inside of of drum 56, a microswitch 104, and a rheostat 106. A fuse is shown at 105. Solenoid 46 is connected to outlet 102 by a conduit 110 and a plug 112. Obviously, solenoid 46 is disconnected upon removal of a potting head 30 and the electrical system is configured as shown to permit interchange of heads. Rheostat 106 is used to adjust the force of ejector plunger 48. Microswitch 104 completes the circuit to energize solenoid 46 upon being operated by contact by valve piece 80 and arm 82 as the operator lifts the valve piece to vent the vacuum. This means that by raising his toe, the operator, in sequence, first vents the vacuum and then energizes the solenoid to eject the pot 10 when a planting is completed and it is desired to remove one pot to insert another pot. A threaded abutment member 120 is used to limit upward movement of arm 82 so that microswitch 104 will not be damaged.

Having thus described my invention, I do not wish to be understood as limiting myself to the precise details of the invention shown but instead I desire to cover those modifications of my invention which will be understood by those skilled in the art upon learning of my invention and which are properly within the scope of my invention.

I claim:

1. The method of potting a plant in a growing medium in a pot having an opening in its bottom, comprising:
   a. providing a work surface with a recess therein,
   b. placing said pot in said recess and applying a vacuum to said recess to retain said pot in said recess and to said pot through said opening,
   c. positioning said plant in said pot and drawing its roots downwardly by said vacuum,
   d. bringing said growing medium across said work surface to said pot, packing said growing medium about said roots of said plant by said vacuum, and filling said pot with said medium, and e. discontinuing said vacuum when said pot is filled and ejecting said pot upwardly out of said recess.

2. The method of potting a plant in a growing medium in a pot having an opening in its bottom, comprising:
   a. applying a vacuum to said pot through said opening,
   b. positioning said plant within said pot and drawing its roots downwardly by said vacuum,
   c. depositing said growing medium in said pot and packing said growing medium about said roots of said plant by said vacuum,
   d. continuing to fill said pot with said medium while maintaining said vacuum, and
   e. removing said pot from said vacuum when said pot is filled.

3. Means for potting a plant in a growing medium in a pot having an opening in its bottom, comprising:
   a. a work surface having means forming a recess therein fitting around said pot with the upper edge of said pot near the level of said work surface,
   b. means applying a vacuum to said recess to hold said pot therein and through said opening to said pot, whereby the roots of said plant are drawn downwardly into said pot by said vacuum when said plant is put in said pot and whereby said growing medium is deposited in said pot and is packed about said roots and said plant by said vacuum, and
   c. means to discontinue said vacuum when said pot has been filled with said medium.

4. The subject matter of claim 3 in which there is a sealed tank under said recess and said means operative to apply a vacuum includes a vacuum source opening into said tank and the vacuum is applied from said tank to said recess, whereby said tank acts as an accumulator of vacuum to apply to said recess and said tank also receives growing medium falling through said recess.

5. The subject matter of claim 4 in which said work surface is a table and has on its under surface an annular groove and resilient sealing material in said groove, said tank having the shape of a drum and means releasably clamping the upper edge of said tank against said resilient sealing material to seal the tank.

6. The subject matter of claim 4 in which said vacuum source is a vacuum pump positioned outside of said tank and tubular means connected to said pump at one end having its other end communicating with the inside of said barrel and located at a point horizontally displaced from said recess whereby growing medium will not fall from said recess into said tubular means and whereby said tubular means will not be blocked by growing medium built up in said tank during potting.

7. The subject matter of claim 4 in which said work surface is a table and said tank has the shape of a drum, said table having a hopper for growing medium and having a discharge opening at table height from said hopper at the opposite side of said table from said work surface, said table having an annular opening therein and a potting head removably fitting into said annular opening, said potting head having said recess in its central portion and its remaining upper surface being flush with said table, the vertical axial center of said drum being farther from one side of the table where the operator can be located than the vertical axial center of said potting head, so that the recess will be located closer to said operator than it would be located if it were centered relative to said drum thereby to provide convenient access to said recess by the operator and maximum room for the operator free from interference by said drum.

8. The subject matter of claim 3 in which there is an ejector below said recess for ejecting said pot from said recess.

9. The subject matter of claim 8 in which there is a solenoid operating said ejector, said means to apply a vacuum including a vacuum pump, tubular means leading from said pump to feed vacuum to said recess, a relief valve to said tubular means including a valve piece operable to vent said tubular means to the atmosphere when operated to discontinue application of vacuum to said recess, a foot pedal connected to and operable to operate said valve piece, means making electrical connection to said solenoid including a switch located adjacent to said valve piece and foot pedal so that when an operator operates said foot pedal, first, the vacuum is discontinued to said recess by venting and, second, said switch is closed to eject said pot.

10. The subject matter of claim 8 in which there is a solenoid operating said ejector and there is operator control means operative to discontinue application of vacuum to said recess and to operate said solenoid.

11. The subject matter of claim 8 in which there is a solenoid operating said ejector and means making electrical connection to said solenoid including a rheostat to control the force of said solenoid.

12. The subject matter of claim 3 in which said means operative to apply a vacuum includes a vacuum pump, tubular means for connecting said pump to said recess, a relief valve connecting to said tubular means including a valve piece venting said tubular line to relieve vacuum from said recess when the valve piece is opened, and operator-controlled means for operating said relief valve.

13. The subject matter of claim 3 in which said work surface has an opening and a potting head removably positioned in said opening, said recess being disposed in said potting head whereby potting heads can be interchanged to use said work surface and said means applying a vacuum to different sized and shaped pots.

14. A pot holder for use in potting a plant in a growing medium in a pot having an opening in its bottom, comprising:
   a. a planar body and an opening in said body in which said pot is positioned and said opening fitting the upper portion of said pot with the upper edge of said pot near to the level of the upper surface of said planar body,
   b. a series of metal plates depending from said body and fitting said pot, said plates being separated whereby vacuum can be applied therebetween, said plates being joined at their lower ends, and
   c. a solenoid depending from said lower ends of said plates and an ejector located below said pot and connected to said solenoid to be operated thereby to eject said pot from said opening.

* * * * *